United States Patent
Auston (10) Patent No.: US 12,305,797 B2
(45) Date of Patent: May 20, 2025

(54) LOAD LIFTING TRIPOD WITH LEG LOCKING RING

(71) Applicant: SafeHold Limited, Kent (GB)

(72) Inventor: Oliver Auston, Kent (GB)

(73) Assignee: SafeHold Limited, Canterbury (GB)

( * ) Notice: Subject to any disclaimer, the term of this patent is extended or adjusted under 35 U.S.C. 154(b) by 0 days.

(21) Appl. No.: 18/376,510

(22) Filed: Oct. 4, 2023

(65) Prior Publication Data

US 2024/0117923 A1  Apr. 11, 2024

(30) Foreign Application Priority Data

Oct. 5, 2022  (GB) ........................................ 2214645

(51) Int. Cl.
  *F16M 11/24*  (2006.01)
  *F16M 11/00*  (2006.01)

(52) U.S. Cl.
  CPC ................................. *F16M 11/245* (2013.01)

(58) Field of Classification Search
  CPC ...... F16M 11/245; F16M 11/02; F16M 11/04; F16M 11/041; G03B 17/561; G03B 17/56; G03B 17/566; F16B 2/065
  USPC ................................................. 248/165, 542
  See application file for complete search history.

(56) References Cited

U.S. PATENT DOCUMENTS

| | | | | |
|---|---|---|---|---|
| 1,221,677 A | * | 4/1917 | Cathcart | F16M 11/12 248/183.1 |
| 3,291,449 A | * | 12/1966 | Hughes | H02G 1/08 254/134.3 FT |
| 3,921,947 A | * | 11/1975 | Adam | F16M 11/16 248/168 |
| 5,002,252 A | | 3/1991 | Setala et al. | |
| 6,773,172 B1 | * | 8/2004 | Johnson | F16M 13/00 396/428 |

(Continued)

FOREIGN PATENT DOCUMENTS

| | | |
|---|---|---|
| CN | 107906332 A | 4/2018 |
| CN | 208348849 U | 1/2019 |
| CN | 216052197 U | 3/2022 |

OTHER PUBLICATIONS

Patents Act 1977: Search Report Under Section 17; for Application No. GB2214645.0; mailed Apr. 3, 2023; 1 page.

*Primary Examiner* — Nkeisha Smith
(74) *Attorney, Agent, or Firm* — Billion & Armitage (57) ABSTRACT

A tripod comprising a head assembly and three legs, wherein each of the three legs is pivotally coupled at a proximal end thereof to the head assembly, the legs having a closed configuration in which they are arranged substantially parallel to each other, and an operative configuration in which the distal ends of the legs are extended outwards; wherein the head assembly includes a head body and a locking ring rotatably coupled to the head body; wherein the locking ring has a first orientation relative to the head body in which portions of the locking ring engage each of the legs in their operative configuration and the locking ring prevents displacement of each leg from its operative configuration to its closed configuration; and the locking ring has a second orientation relative to the head body in which peripheral portions of the locking ring are spaced from each of the legs and the legs are permitted to be displaced from their operative configuration to their closed configuration.

10 Claims, 7 Drawing Sheets

(56) References Cited

U.S. PATENT DOCUMENTS

| | | | | |
|---|---|---|---|---|
| 6,988,846 B2* | 1/2006 | Vogt | ............ | G02B 7/00 |
| | | | | 403/381 |
| 7,490,797 B1* | 2/2009 | Law | ............ | F16M 13/022 |
| | | | | 248/168 |
| 9,447,912 B2* | 9/2016 | De Faveri | ............ | F16M 11/046 |
| 9,476,173 B1* | 10/2016 | Wielenga | ............ | F16M 11/245 |
| 10,234,071 B2* | 3/2019 | Bosnakovic | ............ | F16M 11/28 |
| 11,703,744 B2* | 7/2023 | Chan | ............ | G03B 17/566 |
| | | | | 248/316.2 |
| 11,953,145 B2* | 4/2024 | Zahariev | ............ | F16B 7/1463 |
| 12,030,202 B2* | 7/2024 | Gratsias | ............ | B26B 21/52 |
| 2009/0026330 A1* | 1/2009 | Law | ............ | F16M 11/242 |
| | | | | 248/163.1 |
| 2015/0025301 A1* | 1/2015 | Rosenzweig | ............ | A61M 21/02 |
| | | | | 600/27 |
| 2015/0196000 A1* | 7/2015 | Huang | ............ | F16M 11/24 |
| | | | | 248/440 |
| 2016/0084431 A1* | 3/2016 | Chen | ............ | F16M 11/42 |
| | | | | 361/679.01 |
| 2023/0020970 A1* | 1/2023 | Zahariev | ............ | F16M 11/16 |
| 2023/0022365 A1* | 1/2023 | Fiore | ............ | F16B 7/1463 |

\* cited by examiner

LOAD LIFTING TRIPOD WITH LEG LOCKING RING

The present invention relates to tripods and, in particular, to tripods for use in lowering and raising personnel and/or objects into restricted access areas.

The use of tripods as a support for lowering personnel and/or equipment into restricted access areas is well known. Typically, the tripod is erected over an access hatch or similar opening and supports a cable arrangement which in use supports the weight of the person or other load. After use, the tripod may be collapsed into a transportation configuration and removed.

It is common for the legs of the tripod to be locked in their operative (open) configuration to maintain the stability of the tripod in use. Known locking arrangements include locking pins which pass though both an upper leg housing and an upper portion of the leg. However, it is time consuming to lock each leg in its operative or outwardly extending configuration. Additionally, the locking pins can become detached and lost over time. Moreover, users often forget that the legs are locked in their operative configuration and try to pivot or rotate the legs into their collapsed configuration with the locking pins in place. This can deform the legs and/or shear the locking pin.

The present invention seeks to address or ameliorate at least some of the problems associated with known lifting tripods.

According to a first aspect of the invention, there is provided a tripod comprising a head assembly and three legs, wherein each of the three legs is pivotally coupled at a proximal end thereof to the head assembly, the legs having a closed configuration in which they are arranged substantially parallel to each other, and an operative configuration in which the distal ends of the legs are extended or pivoted outwards; wherein the head assembly includes a head body and a locking ring rotatably coupled to the head body; wherein the locking ring has a first orientation relative to the head body in which portions of the locking ring engage each of the legs in their operative configuration and the locking ring prevents displacement of each leg from its operative configuration to its closed configuration; and the locking ring has a second orientation relative to the head body in which peripheral portions of the locking ring are spaced from each of the legs and the legs are permitted to be displaced from their operative configuration to their closed configuration.

Having a single rotatably locking ring provides a tripod with relatively few moving parts, which in turn makes it cheaper to manufacture and more reliable.

The legs may all be simultaneously released from their operative configuration with the simple rotation of the locking ring. This makes the tripod quicker and easier to collapse for transportation and storage.

In an embodiment of the invention, the locking ring defines three circumferentially spaced apertures or notches, wherein when the locking ring is in its second orientation relative to the head body, each of the apertures or notches is aligned with a respective leg. Thus, each aperture or notch is suitably sized to receive therein a portion of the respective leg. In such embodiments, each leg is received within a respective aperture or notch defined by the locking ring when the legs are in their closed configuration.

It will be appreciated that when the legs are in their operative configuration, the legs are out of alignment with the apertures or notches and a peripheral edge portion of the locking ring engages a portion of each leg, which prevents the pivoting inwards of the distal end of each leg.

Suitably, the locking ring is biased towards its first orientation. Thus, the head assembly may include one or more biasing elements. In such embodiments, the legs may be locked in their operative configuration simply by extending outwards the distal end of each leg. As soon as all of the legs are out of alignment with their respective apertures/notches, the biasing element(s) urge the locking ring to rotate from its second orientation to its first orientation. Accordingly, the legs are automatically locked in their operative configuration as soon as they are positioned in their operative configuration.

In order to prevent accidental or unintended rotation of the locking ring in use, the locking ring may include an orientation lock element; wherein the orientation lock element has a locked configuration in which rotation of the locking ring relative to the head body is prevented, and the orientation lock element has a release configuration in which rotation of the locking ring relative to the head body is permitted. For example, the orientation lock element may comprise a biased pin, a screw or a slidable bar which engages a lock receiving component, suitably carried or defined by the head body.

It will be appreciated that the locking ring does not need to rotate through 360° relative to the head body; it simply needs to be able to rotate such that portions of the locking ring are either engaged with a portion of each leg or are spaced from each leg. Thus, the rotation of the locking ring relative to the head body may be constrained whereby the locking ring may only rotate relative to the head body through a pre-determined angle. For example, the locking ring may rotate through 90° or less, through 75° or less, through 60° or less, through 45° or less, or through 30° or less.

In an embodiment of the invention, one of the locking ring and the head body defines an arcuate channel which defines opposed stop walls, and the other of the locking ring and head body defines a projection which is received within the arcuate channel, wherein displacement of the projection within the channel between the opposed stop walls constrains the angular displacement of the locking ring relative to the head body. Accordingly, the rotation of the locking ring relative to the head body is limited to the angle that is subtended between the opposed stop walls of the arcuate channel.

It is often desired to vary the height of the head assembly above an access opening. Accordingly, each of the legs may be telescopic, wherein the length of the legs is extendible. It will be appreciated that in such embodiments, each leg may comprise a first leg portion and a second leg portion, wherein the second leg portion is at least partially received axially within the first leg portion, whereby the second leg is able to telescope (i.e., extend from or retract within) the first leg portion. Suitably, each telescopic leg includes a length locking element to lock it at a pre-determined length. Accordingly, the second leg portion may be locked relative to the first leg portion to provide a pre-determined leg length.

In a further embodiment of the invention, the head assembly defines a central bore. This is useful to spread the load on the tripod evenly between the three legs. The central bore suitably defines a central axis. The locking ring suitably rotates about this central axis. Similarly, the distal ends of the legs are suitably displaced radially inwards and outwards relative to the central axis when they move from their closed configuration to their operative configuration and vice versa.

In order for the head assembly to define a central bore, both the head body and the locking ring may define respective central bores, wherein the head body bore and the locking ring bore are arranged to be coaxial.

It will be appreciated that the tripod may be used to raise and lower a load. Accordingly, the head assembly may carry at least one pulley wheel. The pulley wheel may guide a load-bearing cable. In order to distribute the weight of any load evenly through each of the legs, a portion of the or each pulley wheel may be aligned with a central bore of the head assembly.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

Figure 1:
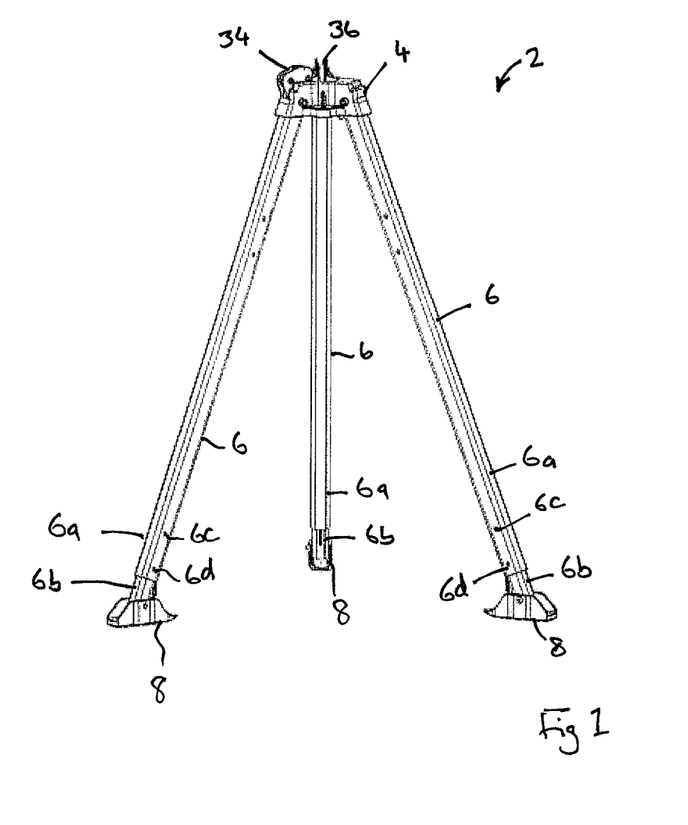
FIG. 1 shows a perspective view of a tripod according to the invention in its operative configuration.

FIG. 1 shows a tripod 2 according to the invention. The tripod 2 comprises a head assembly 4 and three legs 6 which are pivotally coupled to the head assembly 4. The legs 6 are pivotally coupled to the head assembly 4 at a proximal end thereof. The pivot coupling may be any conventional coupling that permits the legs 6 to pivot relative to the head assembly 4.

The legs 6 are two-part telescopic legs and include an outer leg member 6a and an inner leg member 6b. The inner leg member 6b is slidably coupled within a hollow channel defined by the outer leg member 6a in a conventional way. A foot 8 is carried at one end of the inner leg members 6b.

The length of the legs 6 may be extended by extending a portion of the inner leg member 6b from the outer leg member 6a. Locking apertures 6c, 6d are provided through the opposed sides of the outer leg member 6a and corresponding apertures (not shown) are provided through the corresponding opposed sides of the inner leg member 6b. When the out leg locking apertures 6c, 6d are aligned with the corresponding inner leg apertures, a locking pin (not shown) may be inserted through all of the apertures to fix the extended inner leg member 6b relative to the outer leg member 6a.

The head assembly 4 is shown in more detail in FIGS. 2 to 6 and described in more detail below.

Figure 2:
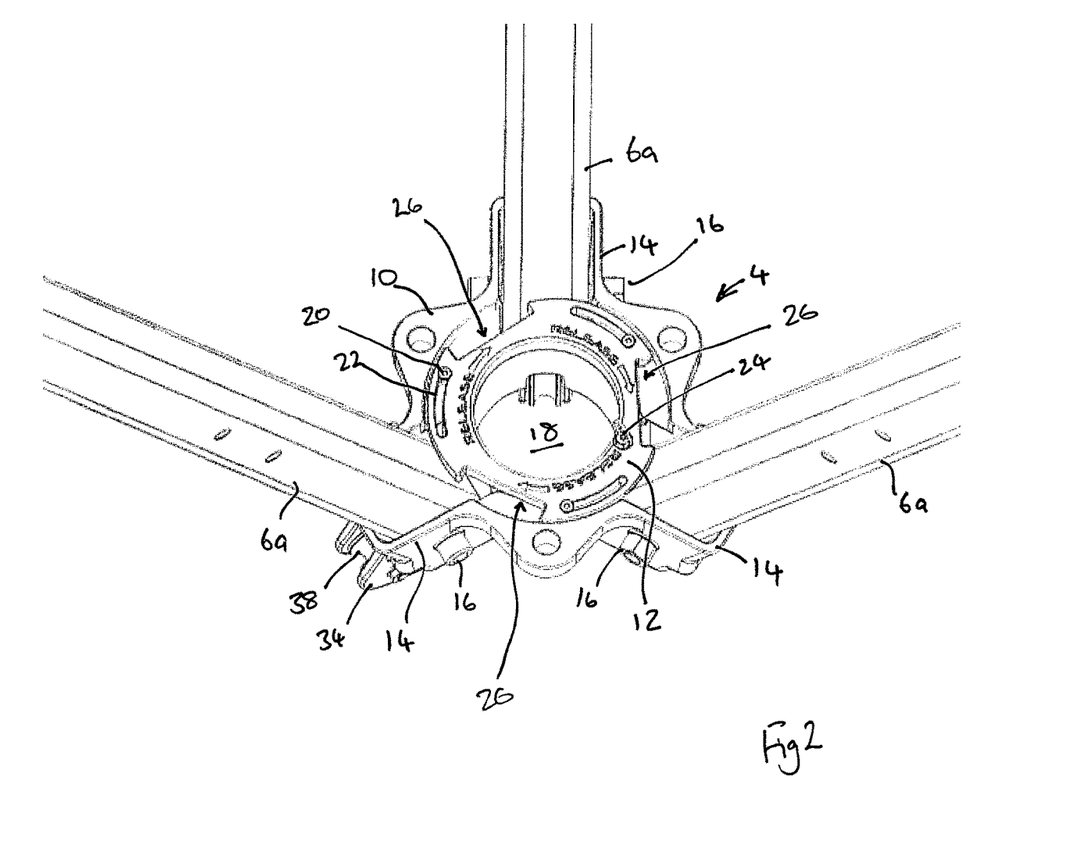
FIG. 2 shows a perspective view from below of part of the tripod shown in FIG. 1 in its operative configuration.

Referring to FIG. 2, the head assembly 4 and the proximal ends of the legs 6 are shown in more detail. The head assembly 4 comprises a head body 10 and a locking ring 12.

As shown in FIG. 2, the legs 6 are in their operative configuration and the locking ring 12 is in a first orientation.

The head body 10 defines three pockets 14 within which are located the proximal ends of the outer leg members 6a. The pockets 14 permit the legs 6 to pivot relative to the head body 10 between defined end points. Each outer leg member 6a is pivotally coupled to a respective one of the pockets 14 via a bolt 16 which passes through one side of the pocket 14, through both opposed walls of the outer leg member 6a and through the opposite side of the pocket 14.

The head body 10 defines a central bore 18, which in turn defines an axis through the head assembly 4. The skilled person will appreciate that the legs pivot such that the feet 8 move in or out radially with respect to the axis.

The locking ring 12 is rotationally coupled to the head body 10. More specifically, the head assembly 4 includes three bolts 20 that have an enlarged head and a waisted middle portion. In addition, the locking ring 12 defines three arcuate channels 22. Each of the arcuate channels 22 has a width that is greater than the diameter of the waisted portion of the bolts 20, but smaller than the enlarged heads of the bolts 20. In this arrangement, the bolts 20 are secured to the head body 10 with their waisted portions disposed within the channels 22 and their enlarged heads adjacent to the outwardly facing surface of the locking ring 12. The locking ring 12 is able to rotate about the axis, but is prevented from axial displacement away from the head body 10 by the enlarged head portions of the bolts 20 not being able to pass through the channels 22.

The length of the arcuate channels 22 defines the maximum angle of rotation through which the locking ring 12 is permitted to rotate.

An orientation lock element 24 is provided which is threadedly coupled to the locking ring 12. The orientation lock element 24 is capable of passing through the locking ring 12 and may engage with a corresponding threaded bore 30 defined by the head body 10. When the legs 6 are in their operative configuration (as shown in FIG. 2), the orientation lock element 24 is threadedly engaged with the threaded bore 30 defined by the head body 10. This engagement prevents rotation of the locking ring 12 relative to the head body 10.

The locking ring 12 further defines three apertures or notches 26, which are sized to receive therein a portion of the outer leg member 6a.

Figure 3:
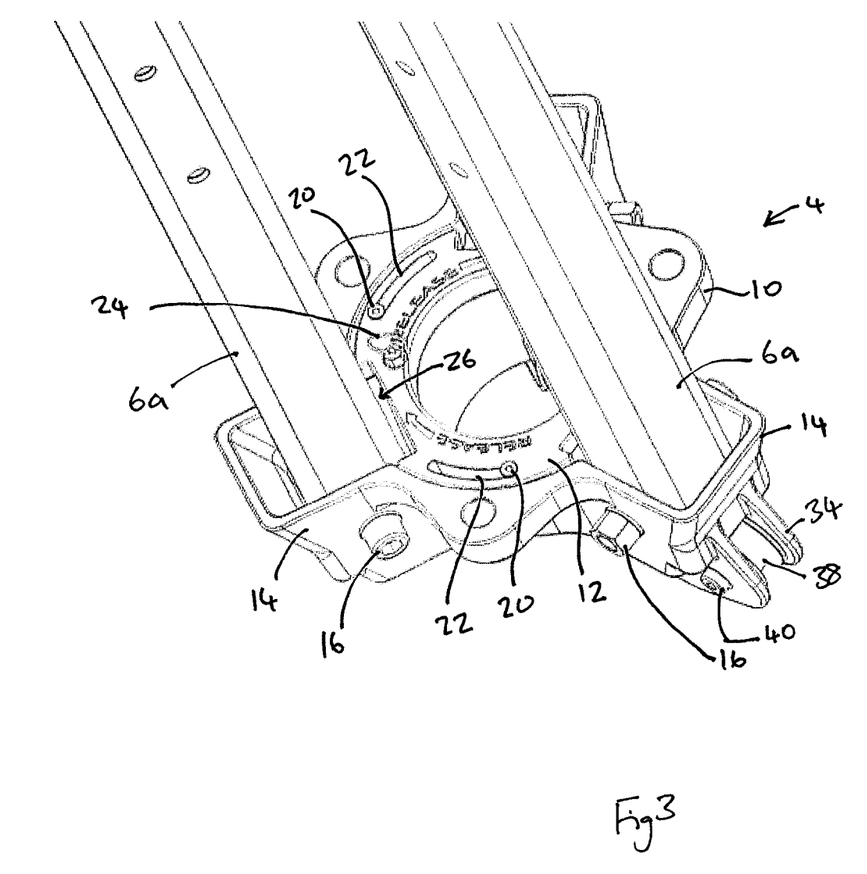
FIG. 3 shows a perspective view from below of the tripod shown in FIG. 1 in its closed configuration.

Referring now to FIG. 3, there is shown the image shown in FIG. 2, but with the legs 6 in their closed configuration and the locking ring 12 in a second orientation. In this configuration, the feet 8 are displaced radially inwards until the outer leg members 6a are arranged substantially parallel to each other.

In order to move the legs 6 from their operative configuration (shown in FIG. 2) to their closed configuration (shown in FIG. 3), the orientation lock element 24 is unscrewed from the head body threaded bore 30, which unlocks the locking ring 12 from the head body 10. In this arrangement, the locking ring 12 may then be rotated clockwise (as shown in FIG. 2) until the apertures/notches 26 align with the respective outer leg members 6a (the second orientation). The outer leg members 6a may then be pivoted inwards until they are substantially parallel. In this arrangement, a portion of each of the outer leg members 6a is received within a corresponding notch 26.

Figure 4:
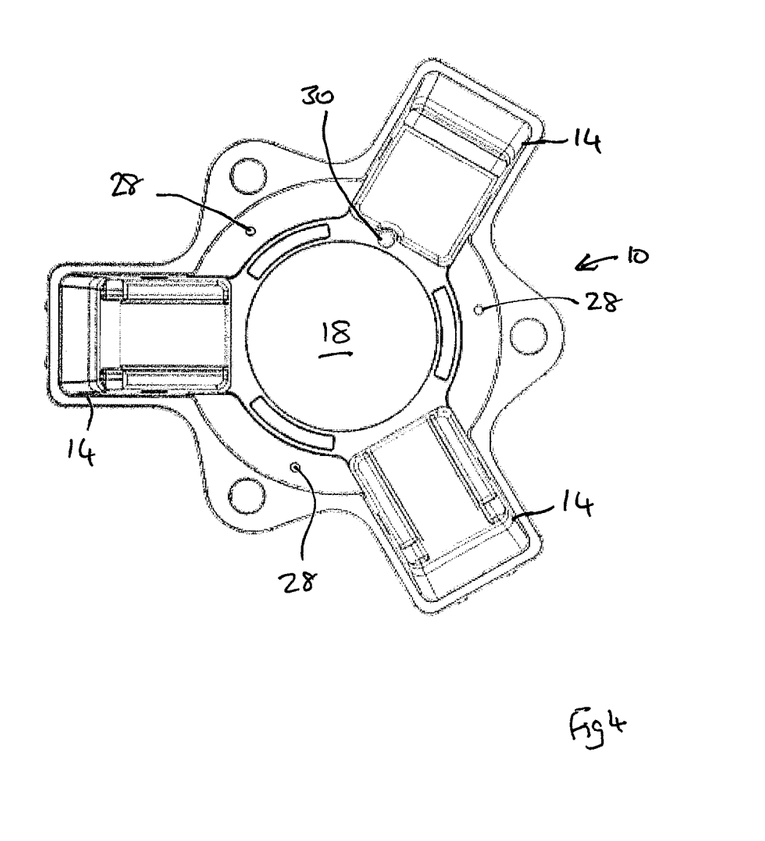
FIG. 4 shows a plan view from below of a head body which forms part of the tripod shown in FIG. 1.

Referring now to FIG. 4, this figure shows a plan view of the head body 10. As can be seen in FIG. 4, the head body defines three threaded bores 28 which receive threaded portions of the bolts 20. The head body 10 further defines the orientation lock element threaded bore 30.

Figure 5:
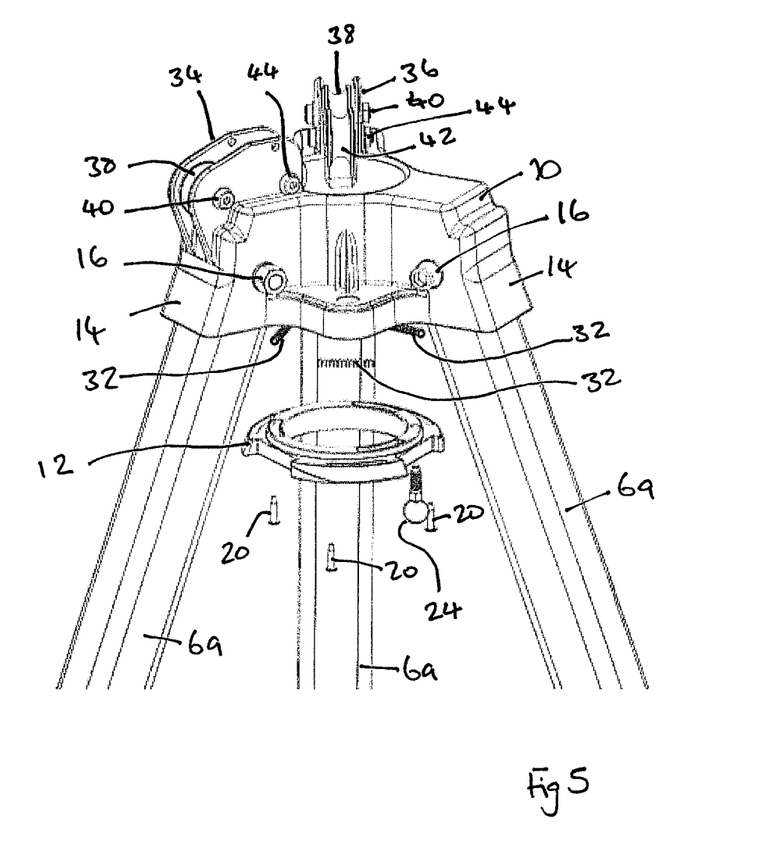
FIGS. 5 and 6 show exploded perspective views of the tripod shown in FIG. 1.
Figure 6:
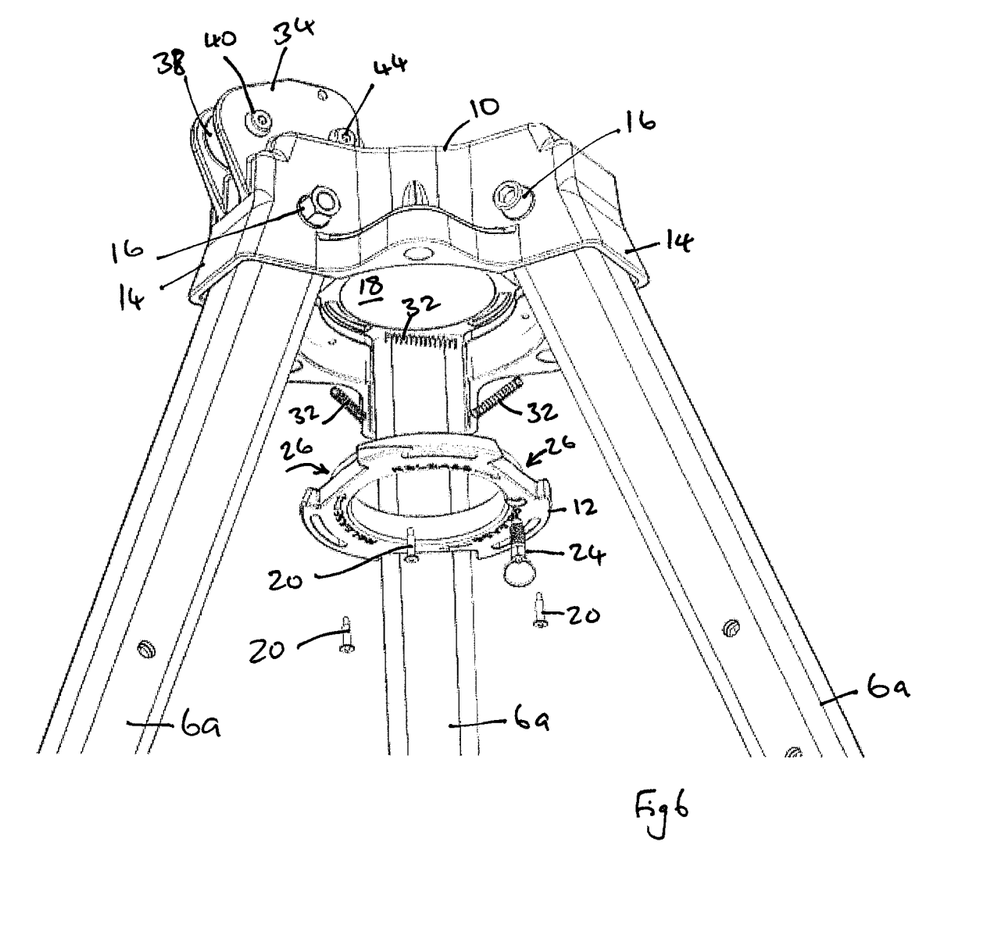

Referring to FIGS. 5 and 6, these figures show exploded views of the top part of the tripod 2.

As can be seen, the locking ring 12 includes three biasing springs 32. One end of each of the springs 32 is connected to the locking ring 12 and the other end of each of the springs 32 is connected to the head body 10. The springs 32 are at rest (i.e., non-extended) when the locking ring 12 is in its first orientation (as shown in FIG. 2). Accordingly, in order to close the legs 6, the locking ring 12 must be rotated against the biasing force exerted by the springs 32 until it is in its second orientation.

The skilled person will appreciate that when the legs 6 are moved to their operative configuration, the locking ring 12 will be urged into its first orientation by the restorative force exerted by each of the springs 32.

As also shown in FIGS. 5 and 6, the tripod 2 includes two pulley arrangements 34, 36. Each pulley arrangement 34, 36 includes a rear pulley wheel 38 which rotates about an axle defined by a bolt 40, and a front pulley wheel 42, which rotates about an axle defined by a second bolt 44. Portions of each of the front pulley wheels 42 overlie a portion of the central bore 18.

In this way, a cable (not shown) may be guided from the rear pulley wheel 38 to the front pulley wheel 42 and then down through the central bore 18. This prevents any snagging or fouling of the cable by the tripod 2 and also permits a load carried by the cable to be distributed substantially equally through each of the legs 6.

Figure 7:
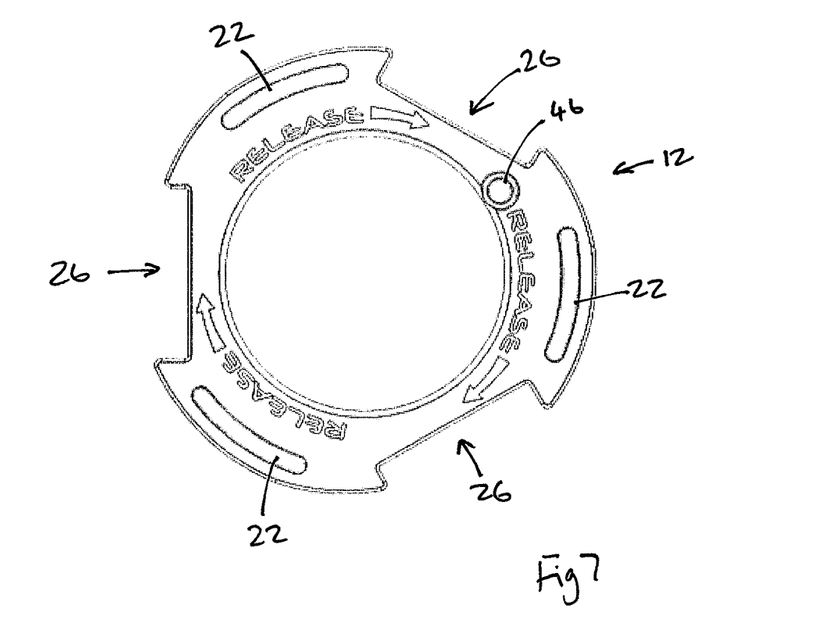
FIG. 7 shows a plan view from below of a locking ring which forms part of the tripod shown in FIG. 1.

Referring now to FIG. 7, this shows a locking ring 12. It will be noted that the locking ring 12 includes a threaded through bore 46 with which the orientation lock element 24 is threadedly engaged.

In use, the tripod 2 starts in its closed configuration. It is positioned over an access hole and the legs 6 are pivoted outwards. When each of the legs 6 is clear of their respective notch 26, the restorative forces in the springs 32 urge the locking ring 12 to rotate from its second orientation to its first orientation in which the locking ring 12 engages portions of the legs 6 and prevents them from pivoting inwards. The orientation lock element 24 is then screwed into the threaded bore 30 to lock the locking ring 12 relative to the head body 10, thereby preventing any unintentional rotation of the locking ring 12.

The pulley arrangements 34, 36 guide lifting cables to the central bore 18 of the head assembly 4.

Once the work is complete, the orientation lock element 24 is unscrewed from the threaded bore 30, which unlocks the locking ring 12 from the head body 10, and the locking ring 12 is rotated relative to the head body 10, with a force that is greater than the biasing force of the springs 32, from its first orientation to its second orientation. When in its second orientation, each of the legs 6 is aligned with a respective notch 26 and the legs 6 are pivoted inwards to their closed configuration.

The invention claimed is:

1. A tripod comprising a head assembly and three legs, wherein each of the three legs includes a proximal end and an opposed distal end; each leg is pivotally coupled at a its proximal end to the head assembly, the legs having a closed configuration in which they are arranged substantially parallel to each other, and an operative configuration in which the distal ends of the legs are extended outwards; wherein the head assembly includes a head body and a locking ring rotatably coupled to the head body; wherein the locking ring has a first orientation relative to the head body in which portions of the locking ring engage each of the legs in their operative configuration and the locking ring prevents displacement of each leg from its operative configuration to its closed configuration; and the locking ring has a second orientation relative to the head body in which peripheral portions of the locking ring are spaced from each of the legs and the legs are permitted to be displaced from their operative configuration to their closed configuration; and wherein the locking ring defines three circumferentially spaced apertures, wherein when the locking ring is in its second orientation relative to the head body, each of the apertures is aligned with a respective leg.

2. A tripod according to claim 1, wherein the locking ring is biased towards its first orientation.

3. A tripod according to claim 1, wherein the locking ring includes an orientation lock element; wherein the orientation lock element has a locked configuration in which rotation of the locking ring relative to the head body is prevented, and the orientation lock element has a release configuration in which rotation of the locking ring relative to the head body is permitted.

4. A tripod according to claim 1, wherein the rotation of the locking ring relative to the head body is constrained whereby the locking ring may only rotate relative to the head body through a pre-determined angle.

5. A tripod according to claim 4, wherein one of the locking ring and the head body defines an arcuate channel which defines opposed stop walls, and the other of the locking ring and head body defines a projection which is received within the arcuate channel, wherein displacement of the projection within the channel constrains the angular displacement of the locking ring relative to the head body between the opposed stop walls.

6. A tripod according to claim 1, wherein each of the legs is telescopic, wherein the length of the legs is extendible.

7. A tripod according to claim 6, wherein each leg includes a length locking element to lock it at a pre-determined length.

8. A tripod according to claim 1, wherein the head assembly defines a central bore.

9. A tripod according to claim 8, wherein the head assembly carries at least one pulley wheel.

10. A tripod according to claim 9, wherein a portion of the or each pulley wheel is aligned with the central bore in use.

* * * * *

UNITED STATES PATENT AND TRADEMARK OFFICE
CERTIFICATE OF CORRECTION

| | | |
|---|---|---|
| PATENT NO. | : 12,305,797 B2 | Page 1 of 1 |
| APPLICATION NO. | : 18/376510 | |
| DATED | : May 20, 2025 | |
| INVENTOR(S) | : Oliver Auston | |

It is certified that error appears in the above-identified patent and that said Letters Patent is hereby corrected as shown below:

In the Specification

Column 6, Line 4, "each leg is pivotally coupled at a its" should read -- each leg is pivotally coupled at its --.

Signed and Sealed this
Fifteenth Day of July, 2025

Coke Morgan Stewart
*Acting Director of the United States Patent and Trademark Office*